United States Patent [19]
Young et al.

[11] Patent Number: 5,796,037
[45] Date of Patent: Aug. 18, 1998

[54] SHALLOW RECESSED FLOOR BOX

[75] Inventors: Joe A. Young, Reedsville, Ohio; Richard L. Arthur, Vienna, W. Va.

[73] Assignee: Walker Systems, Inc., Parkersburg, W. Va.

[21] Appl. No.: 639,991

[22] Filed: Apr. 26, 1996

Related U.S. Application Data

[63] Continuation of Ser. No. 542,393, Oct. 12, 1995, abandoned.
[51] Int. Cl.$^6$ ........................................... H02G 3/12
[52] U.S. Cl. ........................ 174/50; 174/48; 52/220.5
[58] Field of Search ............................ 174/48, 50, 49; 52/220.1, 220.3, 220.5, 220.7

[56] References Cited

U.S. PATENT DOCUMENTS

| | | | |
|---|---|---|---|
| 4,465,897 | 8/1984 | Albrecht | 174/48 |
| 4,864,078 | 9/1989 | Bowman | 174/48 |
| 5,285,009 | 2/1994 | Bowman et al. | 174/48 |
| 5,362,922 | 11/1994 | Whitehead | 174/48 |
| 5,468,908 | 11/1995 | Arthur et al. | 174/48 |

*Primary Examiner*—Kristine L. Kincaid
*Assistant Examiner*—Joseph Waks
*Attorney, Agent, or Firm*—McAndrews, Held & Malloy, Ltd.

[57] ABSTRACT

An electrical floor box providing connections to one or more in-floor service distribution systems includes lower and upper portions defining a hollow interior and a plurality of wiring compartments and conduction tunnels interconnecting the wiring compartments. The lower portion includes a base and a plurality of side walls extending upwardly from the base. The upper portion is slidably connectable to the lower portion forming the hollow interior and the wiring compartments which extend outwardly from, and open to, the hollow interior. The upper portion also includes a top opening which provides access to the hollow interior.

17 Claims, 3 Drawing Sheets

SHALLOW RECESSED FLOOR BOX

CROSS-REFERENCE TO RELATED APPLICATIONS

This is a continuation of application Ser. No. 08/542,393 filed Oct. 12, 1995, now abandoned.

FIELD OF THE INVENTION

The present invention relates generally to a floor box for use with in-floor service distribution systems in concrete floors and, more particularly, to an in-floor box which can be used for activation of one of more services such as power, communication, or data.

BACKGROUND OF THE INVENTION

It is well known to embed distribution systems in floors for providing services such as telecommunications, computer networks, and electrical power to various locations on the floor. Connections to services, or activation of services, for such distribution systems may be made through a hole in the floor surface thereby providing access to a floor box embedded in the floor and connected to one or more service distribution systems.

Known floor boxes provide limited connections and flexibility in configuring the connections to in-floor service distribution systems. Due to the limited connections available, the number of services to which access may be provided is limited, as are the options for routing connectors though conventional floor boxes. In addition, installation of connectors and other activation hardware for in-floor boxes conventionally requires assembly of a significant portion of the activation hardware in such boxes making installation time consuming and expensive.

Floor boxes have been constructed to allow connection to two or more services within a single floor box. Floor boxes, such as the one disclosed by U.S. Pat. No. 5,285,009, issued to Bowman et al., and hereby incorporated by reference, provide for the activation of multiple services and routing of conductors through the floor box in a conductor tunnel formed between the bottom of the floor box and a plate space above the bottom of the floor box. This structure allows connectors of one of more services to be mounted within the floor box and conductors to be routed to the connectors through the floor box. However, the depth of the floor must be sufficient to support the in-floor box having vertically oriented conductor tunnels. Typically, these type of in-floor boxes require concrete floors 3½ inches or greater in depth.

A need therefore exists for a floor box which accommodates many connectors and service conductors and allows greater flexibility for connector configuration and conductor routing than prior floor boxes and which can be used in relatively thin (2⁷⁄₁₆ inches or less, for example) concrete floors.

There is also a need for a floor box for use in relatively thin concrete floors in which connectors can be installed with less assembly and disassembly of activation hardware than is required for installation in prior floor boxes.

A need also exists for a floor box for use in a relatively thin concrete floors which allows greater flexibility in routing conductors through the floor box to connectors within the box and to service distribution systems connected to the box than prior floor boxes.

There is also a need for a floor box for use in relatively thin concrete floors which allows significant disassembly of activation hardware outside the box.

SUMMARY OF THE INVENTION

It is an object of the present invention to provide a floor box for connection to in-floor service distribution systems within relatively thin (2⁷⁄₁₆ inches or less, for example) concrete floors which allows a greater number of connectors for services than prior floor boxes.

Another object of the present invention is to provide a floor box which can be installed in relatively thin concrete floors in which connectors may be easily installed and removed.

Yet another object of the present invention is to provide a floor box which can be installed in relatively thin concrete floors for more than one service and in which barriers may be selectively installed to separate services in the floor box.

Yet another object of the present invention is to provide a floor box which can be installed in relatively thin concrete floors in which conductors may be routed from a service distribution system connection to several locations in the floor box.

Yet another object of the present invention is to provide a floor box which can be installed in relatively thin concrete floors which allows selective installation and removal of connectors without removal or disassembly of the other service connectors mounted within the floor box.

It is yet another object of the present invention is to provide a floor box which can be installed in relatively thin concrete floors which provides for attachment of a cover for abandonment of a previously activated floor box.

The above and other objects are addressed by an electrical floor box providing connections to one or more in-floor service distribution systems. The electrical floor box includes a housing defining a plurality of wiring compartments and a tunnel means for interconnecting the wiring compartments. The wiring compartments extend outwardly from and open to a hollow interior defined by the housing. The tunnel means includes a conductor tunnel adjacent the hollow interior and interconnecting the wiring compartments. Positioning the conductor tunnels in this manner allows for the installation of the electrical floor box in relatively thin concrete floors.

BRIEF DESCRIPTION OF THE DRAWINGS

For a more complete understanding of this invention reference should now be had to the embodiment illustrated in greater detail in the accompanying drawings and described below by way of example the invention. In the drawings.

As used herein, the term "power" refers to 110–120 volt distribution in office buildings and the term "communication" refers to voltages used in telephone, computers, data transmission, and the like.

DETAILED DESCRIPTION OF THE PREFERRED EMBODIMENT

Figure 1:
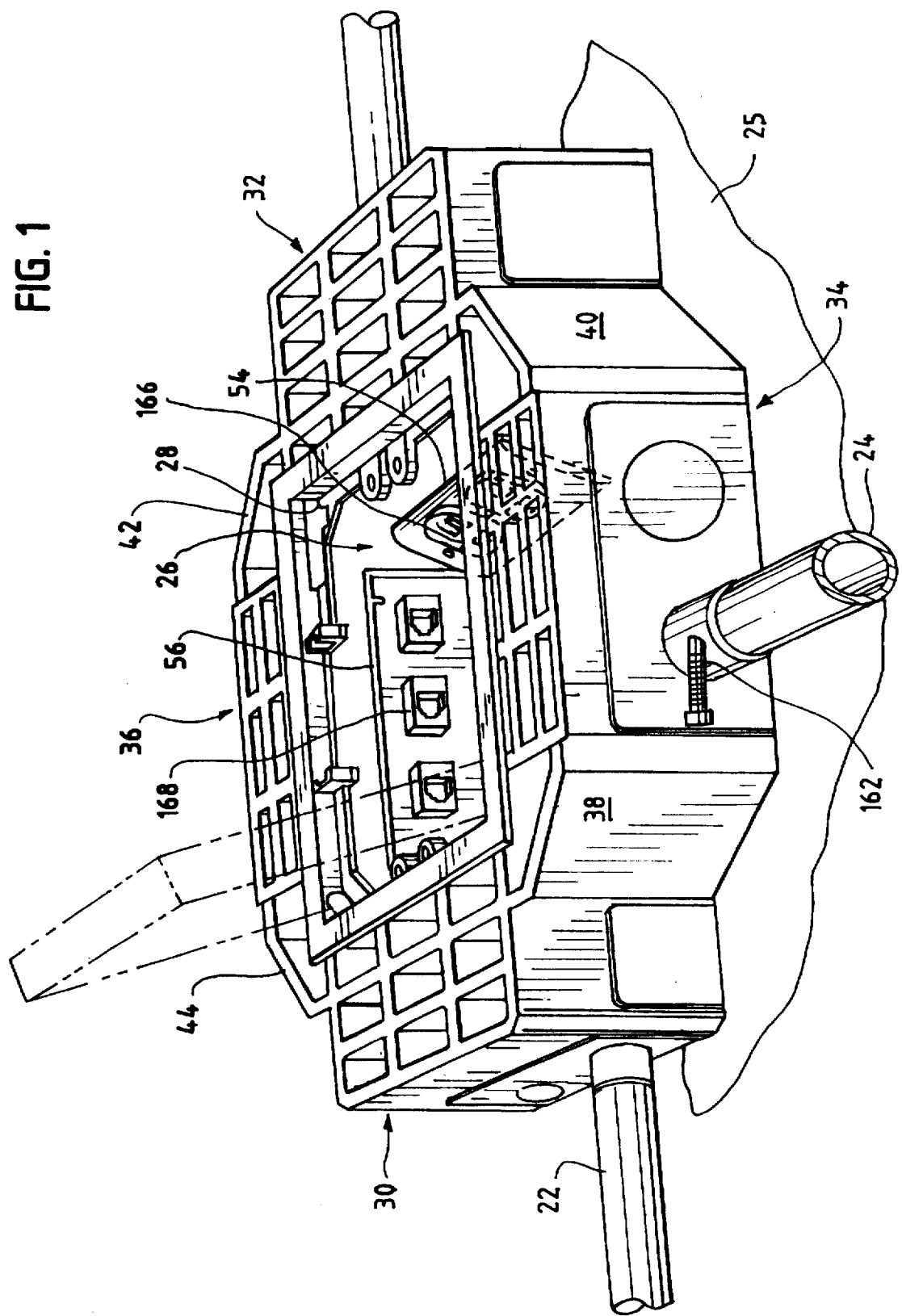
FIG. 1 is a perspective view of an assembled floor box of the present invention.

FIG. 1 illustrates an electrical floor box 20 for providing connections to one or more in-floor service distribution systems 22 and 24. The electrical floor box 20 defines a hollow interior 26 with a top opening 28 providing access to the interior 26. Extending outwardly from, and having openings to, the hollow interior 26 are a plurality of wiring compartments 30, 32, 34, and 36. In addition, a plurality of conductor tunnels 38, 40, 42 and 44 are located adjacent to the hollow interior 26. The conductor tunnels 38, 40, 42, and 44 interconnect adjacent wiring compartments 30, 32, 34, 36 to provide a passageway for electrical conductors (not shown) to extend therebetween.

Figure 2:
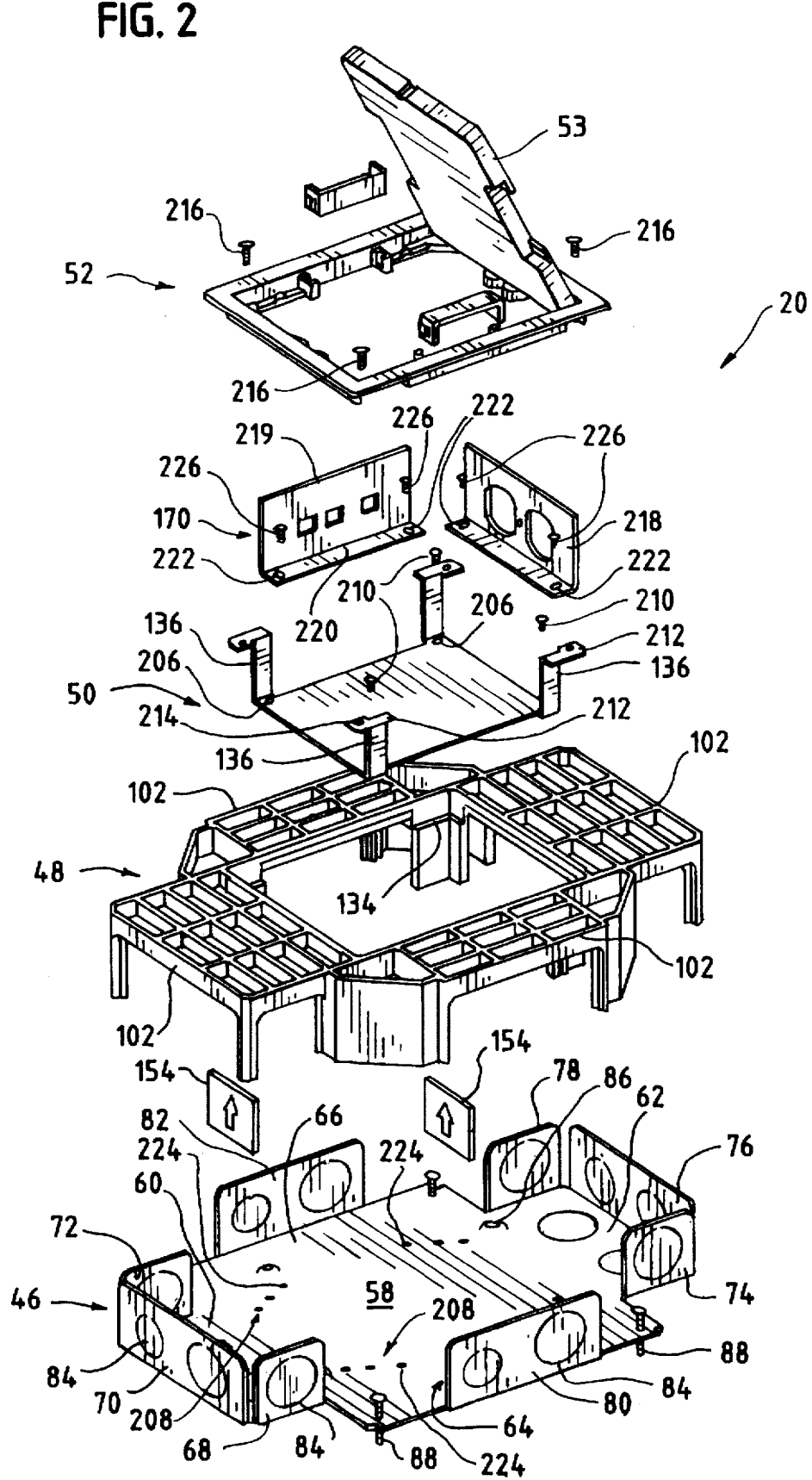
FIG. 2 is an exploded view of a floor box of FIG. 1.

Referring additionally to FIG. 2, the floor box 20 includes a lower portion 46 adapted to be mounted on a sub-floor 25 (see FIG. 1) and an upper portion 48 adapted to engage the lower portion 46. The lower portion 46 is preferably metallic, and, hence, electrically conductive, whereas the upper portion 48 is preferably made of an electrically non-conductive material such as plastic. The upper portion defines the top opening 28 and a bracket plate 50 is designed to slide in and out of the floor box 20 through the opening 28. Located above, and connectable to the bracket plate 50, is an activation kit 52 including a cover 53 which pivots open to allow access to the interior 26 of the floor box 20. This particular activation kit is the subject of U.S. Pat. No. 4,864,078; however, it will be appreciated that other appropriate activation kits may be employed. Located around the periphery of the bracket plate 50 are adjacently disposed power and communication assemblies 54 and 56 (see FIG. 1) providing connections to the power and communication distribution systems 22 and 24, respectively. The assemblies 54, 56 include conventional power and communication interfaces 166, 168, respectively, which face the hollow interior 26. It will be appreciated that other types of activation kits may be utilized in the floor box 20. It will also be appreciated that additional power and communication assemblies 54, 56 may be located around the periphery of the bracket plate 50 to allow further access to the in-floor distribution systems 22 and 24.

The lower portion 46 of the floor box 20 includes a generally rectangular central region 58 having a plurality of wiring sections 60, 62, 64, and 66 extending outwardly therefrom. The wiring sections 60, 62, 64, 66 each include one or more side walls extending upwardly therefrom. Specifically, side walls 68, 70, and 72 extend upwardly from wiring section 60, side walls 74, 76, and 78 extend upwardly from wiring section 62, and side walls 80 and 82 extend upwardly from the wiring sections 64 and 66, respectively. Preferably, each side wall is provided with one or more knock-outs 84 allowing the hollow interior 26 of the floor box 20 to communicate with the in-floor distribution systems 22 and 24.

The lower portion 46 of the floor box 20 may be provided with one or more grounding screws 86 to effectively ground the metal components of the activation kit 52 and the bracket plate 50 to the lower portion 46. The lower portion 46 may also include an adjustable leveling means, such as threaded fasteners 88, which levelingly mounts the floor box 46 to the sub-floor 25.

Figure 3:
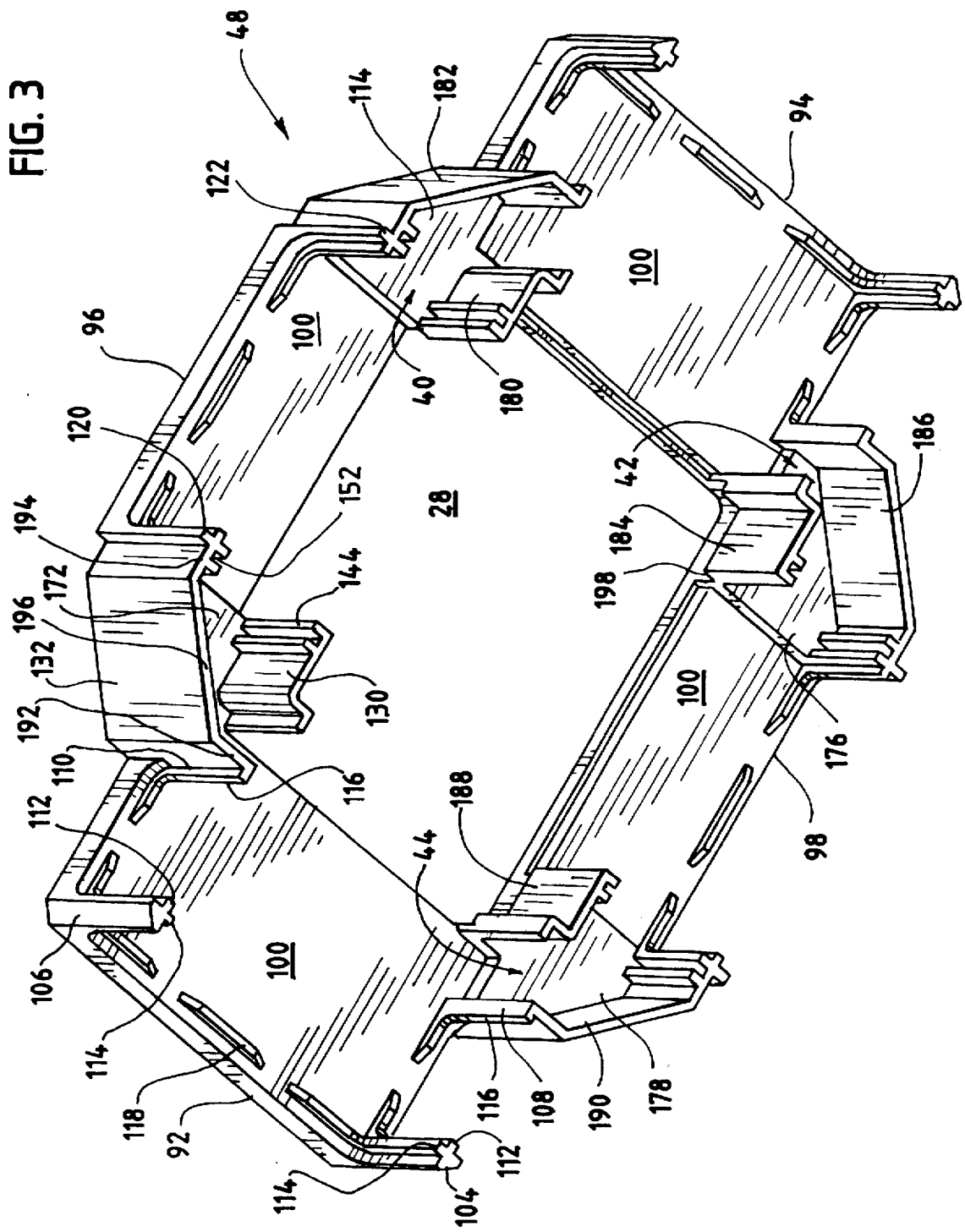
FIG. 3 is a perspective view of the upper housing of the floor box shown in FIG. 2.

Referring additionally to FIG. 3, the upper portion 48 of the floor box 20 includes a plurality of covers 92, 94, 96, and 98 extending outwardly from each side of the top opening 28. Each cover 92, 94, 96, 98 is comprised of a top wall 100 (see FIG. 3) and a plurality of rib walls 102 (see FIGS. 1 and 2) which extend upwardly from the top walls. The rib walls 102 help avoid concrete cracking by deflecting the concrete when the covers 92, 94, 96, and 98 are buried in the concrete floor.

The upper portion 48 also includes generally triangular top walls 172, 174, 176, 178 which extend between the top walls 100 of the adjacent covers 92-98, thereby forming a contiguous top wall around the opening 28.

The upper portion 48 is adapted to slidably engage the lower portion 46 of the floor box 20. For this purpose, the covers 92, 94, 96, and 98 include a plurality of legs extending downwardly from the top walls 100. For example, cover 92 includes legs 104, 106, 108, 110 for slidably engaging the side walls 68, 70, 72 of wiring section 60.

Extending outwardly from legs 104, 106 of cover 92 are a pair of ribs 112, 114. Similarly, a rib 116 extends outwardly from legs 108 and 110. The ribs 112, 114 of legs 104 and 106 and the rib 116 of legs 108 and 110 abut and laterally support the side walls 68, 70, and 72 of the wiring section 60. In addition, a rib 118 is integrally formed with and extends downwardly from the top wall 100 of the cover 92. The rib 118 abuts and laterally supports the side wall 70 of the wiring section 60 when the lower and upper portions 46, 48 are engaged together. Covers 94, 96, and 98 similarly include a plurality of legs and ribs designed to slidably engage and support the side walls of the lower portion 46 of the floor box 20.

As will be appreciated by referring to FIGS. 2 and 3, the wiring compartments 30, 32, 34, 36 are formed by the physical engagement of the lower and upper portions 46, 48 of the electrical floor box 20. For example, wiring compartment 30 is defined by the wiring section 60, side walls 68, 70 and 72, the top wall 100 of the cover 92, and legs 104, 106, 108, 110. Wiring compartments 32, 34 and 36 are similarly formed by the physical engagement of the lower and upper portions 46 and 48 of the floor box 20.

The wiring compartments 30, 32, 34, and 36 are designed to receive conductors from the in-floor distribution systems 22 and 24 through the knockouts 84. The wiring compartments 30, 32, 34, and 36 also are designed to receive power and communication assemblies 54 and 56 connectable to the lower portion 46 of the floor box 20, as explained hereinafter. The symmetrical design of the wiring compartments 30, 32, 34, and 36 allows the power and communication assemblies 54 and 56 to be interchangeably connected to the lower portion 46 of the floor box 20.

As best illustrated in FIGS. 1 and 3, the upper portion 48 of the floor box 20 includes conductor tunnels 38, 40, 42, and 44 which extend between and interconnect the wiring compartments 30, 32, 34, and 36. The conductor tunnels 38, 40, 42, and 44 permit conductors to be selectively routed between the wiring compartments 30, 32, 34, and 36 while preventing the conductors from moving into, or contacting objects in, the interior 26 of the floor box 20. Because the conductor tunnels 38, 40, 42, and 44 are positioned outside of the interior 26 of the floor box, the depth of the floor box can be reduced in comparison to floor boxes such as those disclosed in U.S. Pat. No. 5,285,009. Specifically, this design allows the height of the floor box to be reduced sufficiently to permit the floor box to be installed in relatively shallow floors (e.g., 2⁷⁄₁₆ inches).

With continuing reference to FIGS. 1 and 3, each conductor tunnel 38, 40, 42, 44 is formed by a pair of interior and exterior side walls integrally formed with the upper portion 48 of the floor box 10. Specifically, conductor tunnels 38, 40, 42, 44 are formed, in part, by interior and exterior walls 130 and 132, 180 and 182, 184 and 186, 188 and 190, respectively. For example, conductor tunnel 38 includes interior and exterior walls 130, 132 which adjoin adjacent wiring compartments 30 and 34. The walls 130, 132 extend vertically between the top wall 100 of the upper portion 48 and the central region 58 of the lower portion 46. The interior and exterior side walls 130, 132 extend horizontally between adjacent wiring compartments.

As can be seen in FIG. 3, the exterior side wall 132 of the conductor tunnel 38 includes a first portion 192, a second portion 194, and an angled portion 196 disposed between the first and second portions 192 and 194. The interior wall 130 is generally L-shaped and it extends inwardly into the hollow interior 26 to define a ledge 134. (See FIG. 2). The walls 130, 132 define a pair of opposing slots 144, 152 (see FIG. 3), which are configured to slidably receive a tunnel barrier 154 (see FIG. 1).

It will be appreciated that the other interior and exterior walls 180 and 182, 184 and 186, 188 and 190 of the conductor tunnels 40, 42, and 44, respectively, are similar in design, function, and construction to the previously described conductor tunnel 38.

The tunnel barriers 154 and 156 are designed to be selectively attached to the upper portion 48 of the electrical floor box 20 selectively blocking the conductor tunnels 38, 40, 42, 44, thereby preventing electrical conductors (not shown) from extending between wiring compartments 30, 32, 34, 36. For example, tunnel barriers 154 may be utilized to block conductor tunnels 38 and 40, thereby preventing communication between wiring compartments 30, 34 and wiring compartments 32, 34, respectively. It will be appreciated that additional tunnel barriers (not shown) may be utilized to selectively prevent communication between wiring compartments 30 and 36 and wiring compartments 32 and 36. As will be appreciated, the tunnel barriers 154 must be selectively installed before the concrete is poured over the electrical floor box 20. Thereafter, the tunnel barriers 154 may be broken out of the floor box 20 to selectively "reconnect" the wiring compartments.

As best illustrated in FIG. 2, the bracket plate 50 is designed to be inserted into the hollow interior 26 through the central opening 90. The bracket plate 50 includes apertures 206 which align with reciprocal apertures 208 in the lower portion 46 of the floor box 20. Threaded fasteners 210 extend through the apertures 206 and thread into the appertures 208 to secure the bracket plate 50 to the lower portion 46 of the floor box 20.

The bracket plate 50 also includes a plurality of upwardly extending fingers 136. The tabs 212 extend outwardly from the upper ends of the fingers and over the ledges 134. When the bracket plate 50 is connected to the lower portion 46 of the floor box 20, the tabs 212 engage against the ledges 134 to secure the housing portions 46, 48 together.

The tabs 212 further include threaded appertures 214 for receiving fasteners 216. The fasteners extend through appertures in the activation kit 52 and thread into the appertures 214 to secure the activation kit 52 to the bracket plate 50.

As can be seen in FIG. 2, the power and communication assemblies 54, 56 include respective face plate 218, 219. A tab 220 extending inwardly from the bottom of the face plates 54, 56 includes appertures 222 which align with reciprocal appertures 224 in the lower portion of floor box 20. Threaded fasteners 226 extend through the apertures 222 and thread into the appertures 224 to secure the assemblies 54, 56 to the floor box 20.

The installation of the electrical floor box 20 is best described in two stages, before pouring concrete and after pouring concrete. Before pouring concrete, the knockouts 84 are removed and the in-floor distribution systems 22 and 24 are connected, via conduit fittings 162, to the lower portion 46 of each floor box 20. The number of electrical floor boxes 20 utilized will depend upon the location and layout of the in-floor distribution systems 22 and 24. The wiring compartments 30, 32, 34, and 36 are then selected to be utilized for power or communications distribution. The conductors of the power and communications systems are then arranged on the lower portion 46 of the floor box 20 with the power or communications conductors positioned in adjacently disposed wiring compartments to utilize the feed-through feature of the conductor tunnels 38, 40, 42, and 44. Isolation of wiring compartments 30, 32, 34, and 36 may be accomplished by selectively inserting the tunnel barriers 154 into slots 144 and 152 of the conductor tunnels 38–44.

The lower and upper portions 46 and 48 of the electrical floor box 20 are then slid together. The bracket plate 50 is then inserted into the hollow interior 26 with the tabs 212 of the bracket plate 50 engaging the ledges 134. The bracket plate 50 is secured to the lower portion 46 of the floor box 20 by the threaded fasteners 210. Securing the bracket plate 50 to the lower portion 46 also secures the upper and lower portions of the floor box 20 together. A mud cap (not shown) is inserted over the top opening 28 to protect the hollow interior 26 of the electrical floor box 20 and concrete is then poured over the electrical floor box 20.

After the concrete had been poured, the electrical floor box 20 is located and the concrete above the mud cap is removed. Next, the mud cap and any concrete debris inside the interior 26 of the floor box 20 is also removed. The power and communication assemblies 54, 56 are then electrically connected, via wiring means such as wiring clips, soldering, or wiring crimps, to the in-floor distribution systems 22 and 24. The power and communication assemblies 54, 56 are physically connected, via threaded fasteners 226, to the lower portion 46 of the floor box 20. The activation kit 52 is then connected to the tabs 212 of the fingers 136 by inserting the fasteners 216 into the apertures 214 of the tabs 212. The floor box 20 is activated by inserting a power or communications plug (not shown) into the appropriate power or communication interface 166 and 168, respectively, thereby establishing communication between the plug and the in-floor distribution systems 22 and 24.

The lower portion 46, the bracket plate 50, and the activation kit 52 are preferably made of a metallic material (steel) with the lower portion of the electrical floor box being stamped from a piece of steel. The use of a molded plastic upper portion 48 is desirable both from the stand point of manufacturing and of serving various user needs. The plastic upper portion 48 permits a great variance in shape which cannot be obtained by stamping the portion from steel, which requires greater and more costly secondary manufacturing operations. One type of plastic which may be used for molding the upper portion 46 of the electrical floor box 20 is PVC.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed:

1. An electrical floor box comprising:
   a housing defining a hollow interior, a plurality of wiring compartments extending radially from and opening to the hollow interior, and a plurality of conductor tunnels formed radially external of the hollow interior and interconnecting the plurality of wiring compartments, 2. The electrical floor box as claimed in claim 1, wherein the housing comprises:

a lower portion having a base and a plurality of side walls extending upwardly from the base; and an upper portion connectable to the plurality of side walls of the lower portion forming the hollow interior and the plurality of wiring compartments.

3. The electrical floor box as claimed in claim 2, wherein the plurality of wiring compartments are disposed adjacent each other.

4. The electrical floor box as claimed in claim 2, wherein the upper portion of the housing is slidably connectable to the lower portion of the housing.

5. The electrical floor box as claimed in claim 4, wherein the upper portion of the housing includes a central opening which provides access to the hollow interior.

6. The electrical floor box as claimed in claim 2, wherein as least one of the plurality of side walls has a knock-out.

7. The electrical floor box as claimed in claim 2, wherein the lower portion of the housing is formed of metal and the upper portion of the housing is formed of an electrically non-conductive material.

8. The electrical floor box as claimed in claim 2, further comprising a plurality of tunnel barriers removably connectable to the upper portion of the housing for blocking selected ones of the plurality of conductor tunnels to prevent communication between the plurality of wiring compartments.

9. The electrical floor box as claimed in claim 2, wherein each of said plurality of conductor tunnels includes a bottom wall integrally formed with the lower portion of the housing, a top wall integrally formed with the upper portion of the housing, an interior side wall adjacent to the hollow interior, and an exterior side wall spaced apart from the interior side wall.

10. The electrical floor box as claimed in claim 2, further comprising a bracket plate connectable to the lower portion of the housing and adapted to lockingly secure the lower and upper portions of the housing in an engaged relationship, the bracket plate further including means for supporting an activation kit above the hollow interior.

11. An electrical floor box comprising:

a lower housing portion;

an upper housing portion;

side walls extending between the upper and lower housing portions;

and wherein the upper housing portion, the lower housing portion, and the side walls define a main interior compartments, a plurality of wiring compartments extending radially from and opening to the main interior compartment, and a plurality of conductor tunnels formed radially external of the main interior compartment and interconnecting adjacent pairs of the plurality of wiring compartments.

12. The electrical floor box as claimed in claim 11, further comprising a plurality of tunnel barriers connectable to the upper housing portion for blocking selected ones of the plurality of wiring tunnels to prevent communication between the plurality of wiring compartments.

13. The electrical floor box as claimed in claim 11, wherein at least a portion of the side walls are integrally formed with the lower housing portion, the upper housing portion being adapted to slidably engage the side walls of the lower housing portion to interconnect the upper and lower housing portions.

14. The electrical floor box as claimed in claim 11, wherein each of said plurality of wiring tunnels includes a bottom wall integrally formed with the lower housing portion, a top wall integrally formed with the upper housing portion, an interior side wall adjacent the main interior compartment, and an exterior side wall spaced apart from the interior side wall, and wherein the top, bottom, interior, and exterior walls define the plurality of conductor tunnels.

15. An electrical floor box comprising:

a lower housing portion having a base and a plurality of side walls extending upwardly from the base;

an upper housing portion slidably connectable to the lower housing portion;

the lower housing portion and the upper housing portion defining a main interior compartment, a plurality of wiring compartments extending radially from and opening to the main interior compartment, the upper housing portion having a central opening which provides an access to the main interior compartment; and wherein the housing upper and lower portions further define a plurality of conductor tunnels positioned radially external from the main interior compartment and interconnecting adjacent pairs of the plurality of wiring compartments, each of said plurality conductor tunnels having a top integrally formed with the upper housing portion, a bottom integrally formed with the lower housing portion, an interior side wall integrally formed with the upper housing portion adjacent the main interior compartment, and an exterior side wall integrally formed with the upper housing portion and spaced externally from the interior side wall, the top, bottom, interior, and exterior sides defining the plurality of conductor tunnels interconnecting the plurality of wiring compartments.

16. The electrical floor box as claimed in claim 15, further comprising a plurality of tunnel barriers connectable to the upper housing portion for blocking selected ones of the plurality of conductor tunnels to prevent communication between the plurality of wiring compartments.

17. The electrical floor box as claimed in claim 15, wherein the lower housing portion is formed of metal and the upper housing portion is formed of an electrically non-conductive material.

* * * * *